(12) United States Patent
Onaka et al.

(10) Patent No.: US 12,510,610 B2
(45) Date of Patent: Dec. 30, 2025

(54) MAGNETIC SENSOR AND MAGNETIC DETECTION SYSTEM

(71) Applicant: Panasonic Intellectual Property Management Co., Ltd., Osaka (JP)

(72) Inventors: Kazuhiro Onaka, Hyogo (JP); Naoki Kohara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 177 days.

(21) Appl. No.: 18/561,156

(22) PCT Filed: May 16, 2022

(86) PCT No.: PCT/JP2022/020402
§ 371 (c)(1),
(2) Date: Nov. 15, 2023

(87) PCT Pub. No.: WO2022/244735
PCT Pub. Date: Nov. 24, 2022

(65) Prior Publication Data
US 2024/0255591 A1    Aug. 1, 2024

(30) Foreign Application Priority Data
May 17, 2021   (JP) .................................. 2021-083386

(51) Int. Cl.
*G01R 33/09*   (2006.01)
*G01R 33/02*   (2006.01)

(52) U.S. Cl.
CPC ......... *G01R 33/09* (2013.01); *G01R 33/0206* (2013.01)

(58) Field of Classification Search
CPC .............................. G01R 33/09; G01R 33/0206
See application file for complete search history.

(56) References Cited

U.S. PATENT DOCUMENTS 9,175,942 B2 *  11/2015  Watanabe ................ G01B 7/30
10,989,769 B2 *  4/2021  Zimmer ............... G01R 33/096
(Continued)

FOREIGN PATENT DOCUMENTS

JP     H11-195824 A     7/1990
JP     2000-121386 A    4/2000
(Continued)

OTHER PUBLICATIONS

International Search Report dated Jun. 21, 2022 issued in International Patent Application No. PCT/JP2022/020402, with English translation.

*Primary Examiner* — Reena Aurora
(74) *Attorney, Agent, or Firm* — Rimon P.C.

(57) ABSTRACT

A magnetic sensor includes a first half-bridge circuit, a second half-bridge circuit, and a holding member. The first half-bridge circuit includes a first magnetoresistive effect element and a second magnetoresistive effect element. The second half-bridge circuit includes a third magnetoresistive effect element and a fourth magnetoresistive effect element. The first magnetoresistive effect element detects a magnetic field aligned with an X-axis. The second magnetoresistive effect element detects a magnetic field aligned with a Y-axis. The third magnetoresistive effect element detects a magnetic field aligned with a first axis. The fourth magnetoresistive effect element detects a magnetic field aligned with a second axis.

8 Claims, 7 Drawing Sheets

(56) References Cited

U.S. PATENT DOCUMENTS

| | | | |
|---|---|---|---|
| 2013/0264915 A1* | 10/2013 | Suzuki | H02K 11/215 |
| | | | 310/68 B |
| 2016/0282145 A1 | 9/2016 | Ueda et al. | |
| 2019/0018082 A1 | 1/2019 | Lee | |
| 2019/0064227 A1 | 2/2019 | Takahashi et al. | |
| 2019/0277660 A1 | 9/2019 | Makino et al. | |
| 2021/0018337 A1 | 1/2021 | Makino et al. | |

FOREIGN PATENT DOCUMENTS

| | | | |
|---|---|---|---|
| JP | 2002-303536 A | 10/2002 |
| JP | 2008-101953 A | 5/2008 |
| JP | 2013-195346 A | 9/2013 |
| JP | 2014-206432 A | 10/2014 |
| JP | 2016-186476 A | 10/2016 |
| JP | 2018-107280 A | 7/2018 |
| JP | 2019-039871 A | 3/2019 |
| JP | 2019-158535 A | 9/2019 |
| JP | 2020-106425 A | 7/2020 |
| JP | 2020-144033 A | 9/2020 |

\* cited by examiner

MAGNETIC SENSOR AND MAGNETIC DETECTION SYSTEM

This application is the U.S. National Phase under 35 U.S.C. § 371 of International Patent Application No. PCT/JP2022/020402, filed on May 16, 2022, which in turn claims the benefit of Japanese Patent Application No. 2021-083386, filed on May 17, 2021, the entire disclosures of which Applications are incorporated by reference herein.

TECHNICAL FIELD

The present disclosure generally relates to a magnetic sensor and a magnetic detection system, and more particularly relates to a magnetic sensor, including a plurality of magnetoresistive effect elements, and a magnetic detection system.

BACKGROUND ART

Patent Literature 1 discloses a magnetic sensor including a plurality of magnetoresistive elements (magnetoresistive effect elements). Each of the magnetoresistive elements includes a free magnetic layer, of which the magnetization direction changes under the influence of an external magnetic field, and a pin magnetic layer, of which the magnetization direction is fixed. The plurality of magnetoresistive elements consists of a first pair of magnetoresistive elements and a second pair of magnetoresistive elements. In the first pair of magnetoresistive elements and the second pair of magnetoresistive elements, their respective first pin magnetic layers have the same magnetization direction and their respective second pin magnetic layers also have the same magnetization direction.

CITATION LIST

Patent Literature

Patent Literature 1: JP 2014-206432 A

SUMMARY OF INVENTION

An object of the present disclosure is to provide a magnetic sensor and a magnetic detection system, each contributing to more accurately detecting the orientation of a magnetic field applied to a magnetic sensor.

A magnetic sensor according to an aspect of the present disclosure includes a first half-bridge circuit, a second half-bridge circuit, and a holding member. The first half-bridge circuit includes: a first magnetoresistive effect element and a second magnetoresistive effect element that are half-bridge connected to each other; and a first output terminal that delivers a first output signal from a node of connection between the first magnetoresistive effect element and the second magnetoresistive effect element. The second half-bridge circuit includes: a third magnetoresistive effect element and a fourth magnetoresistive effect element that are half-bridge connected to each other; and a second output terminal that delivers a second output signal from a node of connection between the third magnetoresistive effect element and the fourth magnetoresistive effect element. The holding member holds the first half-bridge circuit and the second half-bridge circuit. The first magnetoresistive effect element detects a magnetic field aligned with an X-axis. The second magnetoresistive effect element detects a magnetic field aligned with a Y-axis perpendicular to the X-axis. The third magnetoresistive effect element detects a magnetic field aligned with a first axis coplanar with the X-axis and the Y-axis and different from any one of the X-axis or the Y-axis. The fourth magnetoresistive effect element detects a magnetic field aligned with a second axis coplanar with the X-axis and the Y-axis and perpendicular to the first axis.

A magnetic detection system according to another aspect of the present disclosure includes the magnetic sensor described above and a processing circuit. The processing circuit determines, based on at least the first output signal and the second output signal, an orientation of a magnetic field applied to the magnetic sensor.

DESCRIPTION OF EMBODIMENTS

A magnetic sensor and magnetic detection system according to an exemplary embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

(Overview)

Figure 1:
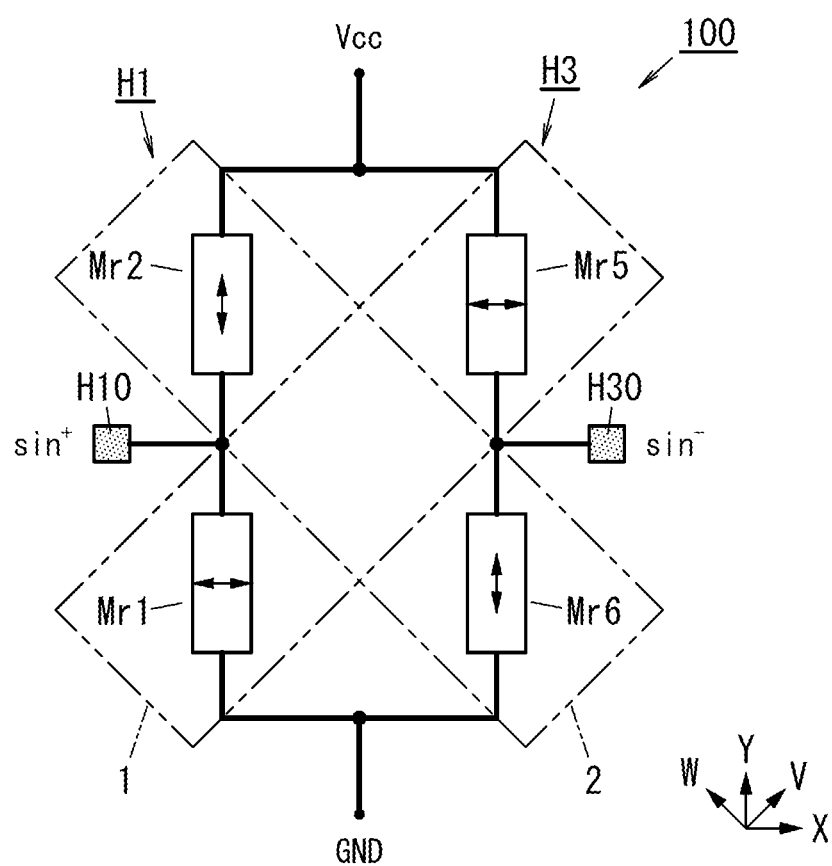
FIG. 1 is an equivalent circuit diagram of a first half-bridge circuit and a third half-bridge circuit of a magnetic sensor according to an exemplary embodiment.
Figure 2:
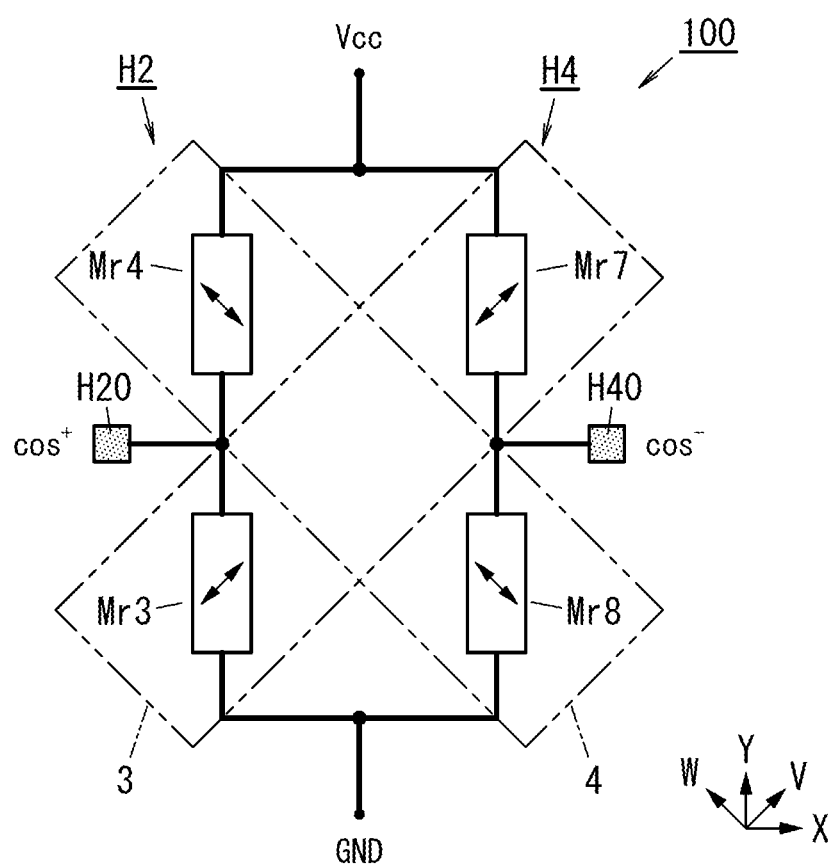
FIG. 2 is an equivalent circuit diagram of a second half-bridge circuit and a fourth half-bridge circuit of the magnetic sensor.
Figure 4:
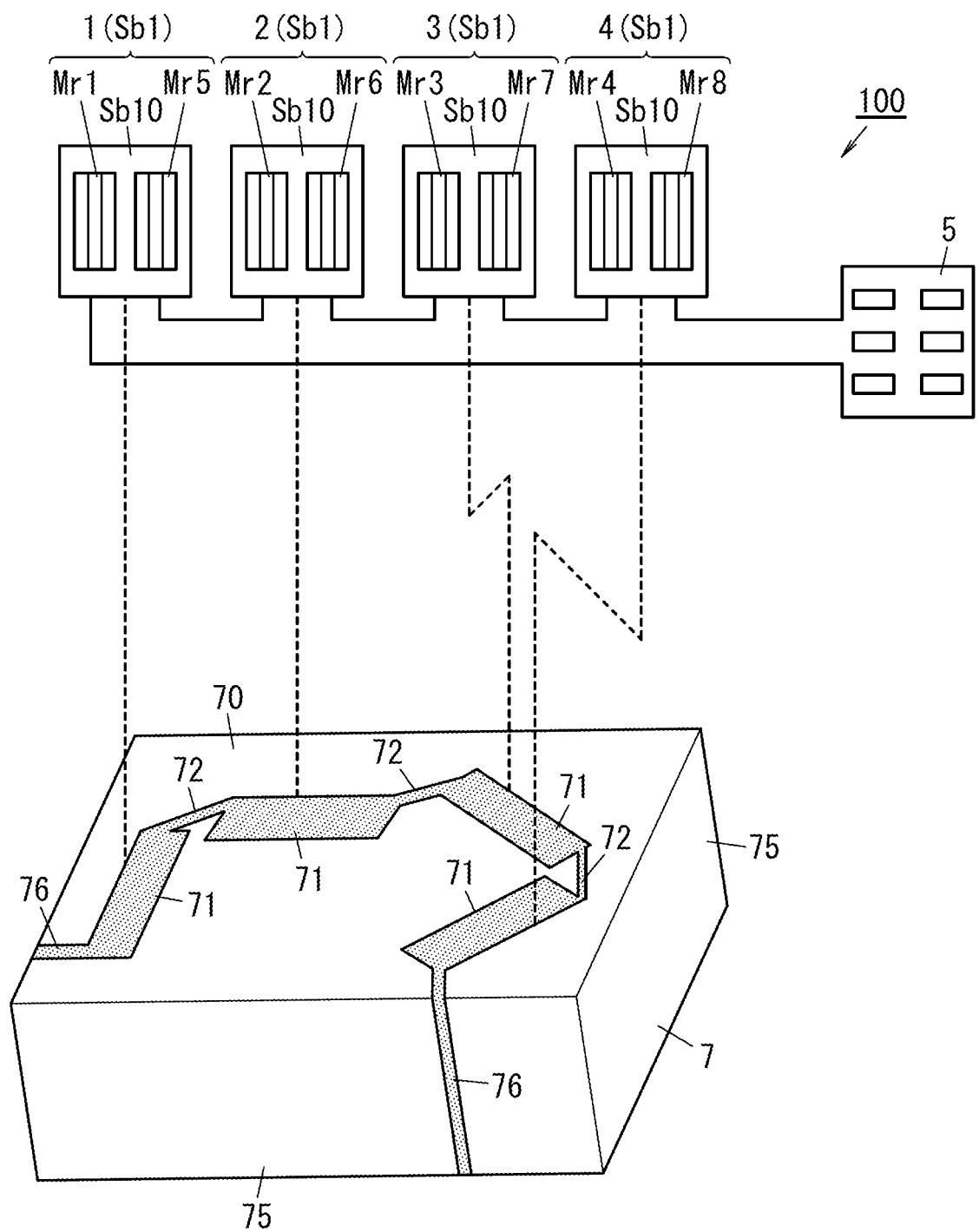
FIG. 4 is an exploded perspective view of the magnetic sensor.

As shown in FIGS. 1 and 2, a magnetic sensor 100 according to an exemplary embodiment includes a first half-bridge circuit H1, a second half-bridge circuit H2, and a holding member 7 (refer to FIG. 4). The first half-bridge circuit H1 includes: a first magnetoresistive effect element Mr1 and a second magnetoresistive effect element Mr2 that are half-bridge connected to each other; and a first output terminal H10 that delivers a first output signal from a node of connection between the first magnetoresistive effect element Mr1 and the second magnetoresistive effect element Mr2. The second half-bridge circuit H2 includes: a third magnetoresistive effect element Mr3 and a fourth magnetoresistive effect element Mr4 that are half-bridge connected to each other; and a second output terminal H20 that delivers a second output signal from a node of connection between the third magnetoresistive effect element Mr3 and the fourth magnetoresistive effect element Mr4. The holding member 7 holds the first half-bridge circuit H1 and the second half-bridge circuit H2.

In the following description, each of the first to fourth magnetoresistive effect elements Mr1-Mr4 and fifth to eighth magnetoresistive effect elements Mr5-Mr8 (to be described later) will be hereinafter referred to as a magnetoresistive effect element Mr0 (refer to FIG. 6).

In FIGS. 1 and 2, the double-headed arrow placed inside the rectangle representing each magnetoresistive effect element Mr0 indicates the sensitivity directions of the magnetoresistive effect element Mr0 with respect to a magnetic field. The sensitivity directions are controlled by adjusting the orientation of each magnetoresistive effect element Mr0.

The first magnetoresistive effect element Mr1 detects a magnetic field aligned with an X-axis. The second magnetoresistive effect element Mr2 detects a magnetic field aligned with a Y-axis perpendicular to the X-axis. The third magnetoresistive effect element Mr3 detects a magnetic field aligned with a first axis (V-axis). The first axis (V-axis) is coplanar with the X-axis and the Y-axis and different from any one of the X-axis or the Y-axis. The fourth magnetoresistive effect element Mr4 detects a magnetic field aligned with a second axis (W-axis). The second axis (W-axis) is coplanar with the X-axis and the Y-axis and perpendicular to the first axis (V-axis).

This embodiment causes the first output signal delivered as the magnetic field applied to the magnetic sensor 100 rotates to have a waveform close to an ideal sinusoidal wave and causes the second output signal to have a waveform having a phase shift with respect to the sinusoidal wave. This enables accurately determining, based on the first output signal and the second output signal, the orientation of the magnetic field applied to the magnetic sensor 100.

In addition, the first half-bridge circuit H1 and the second half-bridge circuit H2 are aggregated together in the single holding member 7. This saves the trouble of adjusting the positional relation between the plurality of magnetoresistive effect elements Mr0, compared to a situation where the plurality of magnetoresistive effect elements Mr0 are distributed in multiple members. In addition, this also reduces the chances of a change in positional relation causing a decline in the accuracy of the orientation of the magnetic field detected.

In the following description, a Z-axis, which is an axis perpendicular to both the X-axis and the Y-axis, will be used along with the X-axis, the Y-axis, the V-axis, and the W-axis. Note that each of the X-axis, the Y-axis, the Z-axis, the V-axis, and the W-axis is a virtual axis defined on the magnetic sensor 100 and is an insubstantial one.

(Details)

(1) Overall Configuration

Figure 3:
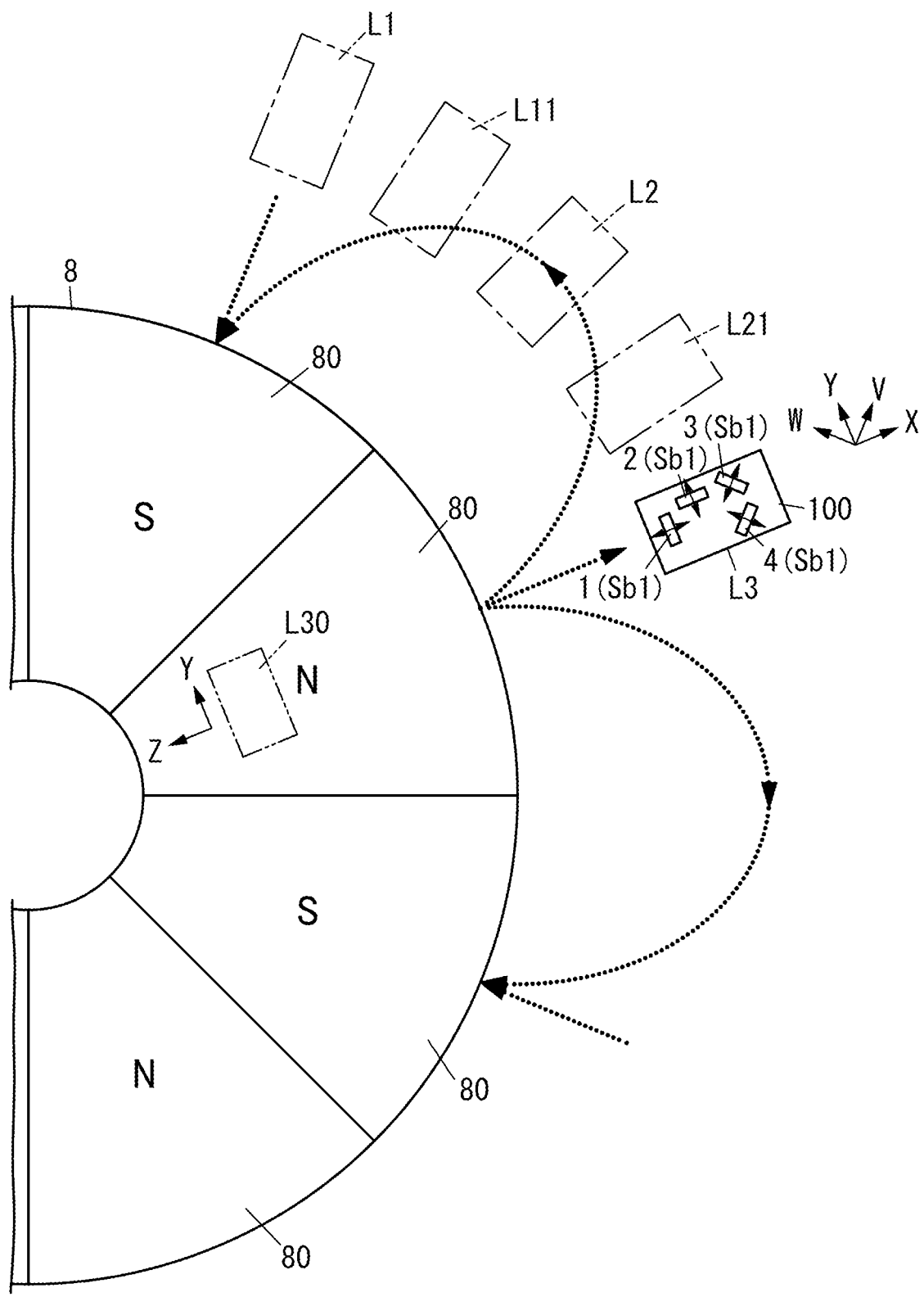
FIG. 3 is a schematic representation illustrating how the magnetic sensor may be used.
Figure 5:
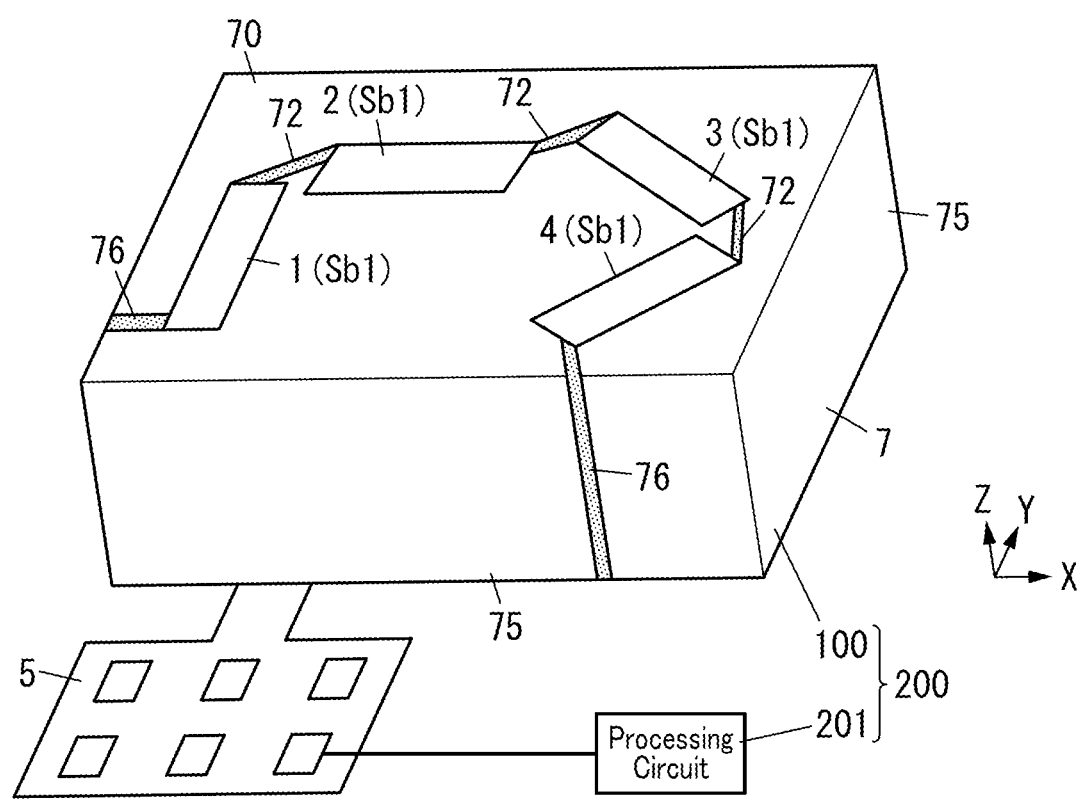
FIG. 5 is a perspective view of the magnetic sensor.

As shown in FIGS. 3-5, the magnetic sensor 100 includes a first sensor block 1, a second sensor block 2, a third sensor block 3, a fourth sensor block 4, a flexible board 5, and a holding member 7.

In the following description, each of the first sensor block 1, the second sensor block 2, the third sensor block 3, and the fourth sensor block 4 will be hereinafter sometimes referred to as a "sensor block Sb1." Each sensor block Sb1 includes two magnetoresistive effect elements Mr0.

In FIG. 3, the double-headed arrow shown to penetrate through the rectangle representing each sensor block Sb1 indicates the sensitivity directions of the two magnetoresistive effect element Mr0 of the sensor block Sb1 with respect to a magnetic field. One magnetoresistive effect element Mr0 out of the two magnetoresistive effect elements Mr0 included in one sensor block Sb1 has the same sensitivity directions as the other magnetoresistive effect element Mr0.

As shown in FIG. 5, a magnetic detection system 200 includes the magnetic sensor 100 and a processing circuit 201. The processing circuit 201 determines, based on at least the first output signal and the second output signal, the orientation of a magnetic field applied to the magnetic sensor 1M).

In the following description of embodiments, the magnetic sensor 100 and the magnetic detection system 200 are supposed to be used to determine the orientation of a magnetic field generated from a rotor 8 (refer to FIG. 3) of a motor and thereby determine the rotational angle of the rotor 8.

(2) Rotor

The rotor 8 includes a plurality of permanent magnets. The plurality of permanent magnets form a plurality of magnetic poles 80. In other words, the plurality of permanent magnets has the plurality of magnetic poles 80. The plurality of magnetic poles 80 are arranged side by side in the rotational direction of the rotor 8 such that N-poles and S-poles are alternately arranged. In FIG. 3, the plurality of magnetic poles 80 are arranged side by side such that the N- and S-poles alternate with each other every 45 degrees in the rotational direction of the rotor 8. In FIG. 3, each of the magnetic poles 80 is labeled as either "N" indicating that the magnetic pole 80 is an N-pole or "S" indicating that the magnetic pole 80 is an S-pole. Note that the letters "N" and "S" are shown on the drawings for illustrative purposes only and actually the magnetic poles 80 do not have such inscribed letters.

(3) Sensor Block

The plurality of sensor blocks Sb1 have the same configuration. Each sensor block Sb1 has a body Sb10 and two magnetoresistive effect elements Mr0.

More specifically, the first sensor block Sb1 includes a (first) body Sb10, the first magnetoresistive effect element Mr1, and the fifth magnetoresistive effect element Mr5. The second sensor block Sb1 includes a (second) body Sb10, the second magnetoresistive effect element Mr2, and the sixth magnetoresistive effect element Mr6. The third sensor block Sb1 includes a (third) body Sb10, the third magnetoresistive effect element Mr3, and the seventh magnetoresistive effect element Mr7. The fourth sensor block Sb1 includes a (fourth) body Sb10, the fourth magnetoresistive effect element Mr4, and the eighth magnetoresistive effect element Mr8.

The body Sb10 has a rectangular parallelepiped shape. The body Sb10 has a square form when viewed in plan. The body Sb10 holds two magnetoresistive effect elements Mr0. The body Sb10 is held by the holding member 7.

The (first) body Sb10 of the first sensor block 1 holds the first magnetoresistive effect element Mr1 and the fifth magnetoresistive effect element Mr5. The (second) body Sb10 of the second sensor block 2 holds the second magnetoresistive effect element Mr2 and the sixth magnetoresistive effect element Mr6. The (third) body Sb10 of the third sensor block 3 holds the third magnetoresistive effect element Mr3 and the seventh magnetoresistive effect element Mr7. The (fourth) body Sb10 of the fourth sensor block 4 holds the fourth magnetoresistive effect element Mr4 and the eighth magnetoresistive effect element Mr8.

The magnetoresistive effect element Mr0 has an electrical resistance value that varies according to the magnitude of magnetic field applied. The magnetic sensor 100 outputs, as a voltage signal, the variation in the electrical resistance value of the magnetoresistive effect element Mr0. The magnetoresistive effect element Mr0 has no sensitivity to a magnetic field in a predetermined first direction but has sensitivity to a magnetic field in a second direction perpendicular to the first direction. The sensitivity of the magnetoresistive effect element Mr0 is maximum to the magnetic field in the second direction.

The magnetoresistive effect element Mr0 causes a resistance variation in the same pattern in response to a magnetic field in one direction and a magnetic field in the opposite direction if these two magnetic fields have the same magnitude. Take one sensor block Sb1, for example, and it can be seen that the two magnetoresistive effect elements Mr0 are arranged in the sensor block Sb1 to face the same direction.

(4) Holding Member and Flexible Board

As shown in FIG. 4, the holding member 7 may have, for example, a rectangular parallelepiped shape. The holding member 7 is a molded product of synthetic resin. The holding member 7 has a surface 70. The surface 70 has a plurality of (e.g., four in the example illustrated in FIG. 4) depressions 71. The plurality of depressions 71 correspond one to one to the plurality of sensor blocks Sb1. Each depression 71 receives a corresponding one of the sensor blocks Sb1 inserted thereto. In this manner, the holding member 7 holds the plurality of sensor blocks Sb1. Also, each sensor block Sb1 is inserted into a corresponding one of the depressions 71 after having been mounted onto the flexible board 5. That is to say, the plurality of sensor blocks Sb1 are held along with the flexible board 5 by the holding member 7.

The holding member 7 has a plurality of (e.g., three in the example illustrated in FIG. 4) grooves 72 to which the flexible board 5 is inserted. The plurality of depressions 71 are connected to each other via the plurality of grooves 72. The holding member 7 also has four (only two of which are shown in FIG. 4) side surfaces 75, which intersect with the surface 70. Two out of the four side surfaces 75 each have an insert hole 76. Each insert hole 76 communicates with a corresponding one of the depressions 71. The flexible board 5 is passed through at least one of these two insert holes 76. This allows a part of the flexible board 5 to be extended out of the holding member 7.

As described above, the plurality of sensor blocks Sb1 are mounted onto the flexible board 5. The plurality of sensor blocks Sb1 includes the first to eighth magnetoresistive effect elements Mr1-Mr8. That is to say, the first, second, third, and fourth magnetoresistive effect elements Mr1-Mr4 and the fifth, sixth, seventh, and eighth magnetoresistive effect elements Mr5-Mr8 are mounted onto the flexible board 5. Furthermore, the holding member 7 holds, along with the flexible board 5, the plurality of sensor blocks Sb1. That is to say, the holding member 7 holds, along with the flexible board 5, the first, second, third, and fourth magnetoresistive effect elements Mr1-Mr4 and the fifth, sixth, seventh, and eighth magnetoresistive effect elements Mr5-Mr8.

When the flexible board 5 is unfolded in a flat shape, the plurality of sensor blocks Sb1 are arranged in line on the flexible board 5. Each sensor block Sb1 is inserted into a corresponding one of the depressions 71 along a normal to the surface 70 of the holding member 7. The part, located between the plurality of sensor blocks Sb1, of the flexible board 5 is inserted into the plurality of grooves 72. The flexible board 5 is partially extended out of the holding member 7 through the insert holes 76.

The flexible board 5 electrically connects together the plurality of magnetoresistive effect elements Mr0 of the plurality of sensor blocks Sb1. The plurality of magnetoresistive effect elements Mr0 are also electrically connected to the processing circuit 201 and a power supply via the flexible board 5. More specifically, the plurality of magnetoresistive effect elements Mr0 are electrically connected to the processing circuit 201 via the first output terminal H10, the second output terminal H20, a third output terminal H30 (to be described later), and a fourth output terminal H40 (to be described later).

(5) Magnetoresistive Effect Element

First, the sensitivity directions of each magnetoresistive effect element Mr0 to magnetic field will be described with reference to FIGS. 1 and 2.

When the plurality of sensor blocks Sb1 are held by the holding member 7, the first magnetoresistive effect element Mr1 and the fifth magnetoresistive effect element Mr8 of the first sensor block 1 are oriented to detect a magnetic field aligned with the X-axis. At this time, the second magnetoresistive effect element Mr2 and the sixth magnetoresistive effect element Mr6 of the second sensor block 2 are oriented to detect a magnetic field aligned with the Y-axis.

Also, at this time, the third magnetoresistive effect element Mr3 and the seventh magnetoresistive effect element Mr7 of the third sensor block 3 are oriented to detect a magnetic field aligned with the V-axis (first axis). Meanwhile, at this time, the fourth magnetoresistive effect element Mr4 and the eighth magnetoresistive effect element Mr8 of the fourth sensor block 4 are oriented to detect a magnetic field aligned with the W-axis (second axis).

The V-axis (first axis) is an axis aligned with a 45-degree direction with respect to the X-axis. As used herein, the expression that one of the two axes (e.g., the V-axis and the X-axis in this example) "is an axis aligned with a 45-degree direction with respect to" the other axis refers to a situation where the angular difference between the two axes is equal to or greater than 40 degrees and equal to or less than 50 degrees. Also, the angular difference between the sensitivity direction of the first sensor block 1 to magnetic field and the sensitivity direction of the third sensor block 3 to magnetic field is preferably equal to or greater than 40 degrees and equal to or less than 50 degrees.

The W-axis (second axis) is an axis aligned with a 45-degree direction with respect to the Y-axis. That is to say, the angular difference between the W- and Y-axes is equal to or greater than 40 degrees and equal to or less than 50 degrees. Also, the angular difference between the sensitivity direction of the second sensor block 2 to magnetic field and the sensitivity direction of the fourth sensor block 4 to magnetic field is preferably equal to or greater than 40 degrees and equal to or less than 50 degrees.

The angular difference between the sensitivity direction of the first sensor block 1 to magnetic field (i.e., a direction aligned with the X-axis) and the sensitivity direction of the second sensor block 2 to magnetic field (i.e., a direction aligned with the Y-axis) is preferably equal to or greater than 85 degrees and less than 95 degrees.

The angular difference between the sensitivity direction of the third sensor block 3 to magnetic field (i.e., a direction aligned with the V-axis) and the sensitivity direction of the fourth sensor block 4 to magnetic field (i.e., a direction aligned with the W-axis) is preferably equal to or greater than 85 degrees and less than 95 degrees.

A first terminal of the first magnetoresistive effect element Mr1 is electrically connected to a lower-potential electrical path of the power supply (i.e., an electrical path with a reference potential). In this embodiment, the reference potential is ground potential. A second terminal of the first magnetoresistive effect element Mr1 is electrically connected to a first terminal of the second magnetoresistive effect element Mr2. A second terminal of the second magnetoresistive effect element Mr2 is electrically connected to a higher-potential electrical path of the power supply.

A first terminal of the third magnetoresistive effect element Mr3 is electrically connected to the lower-potential electrical path of the power supply. A second terminal of the third magnetoresistive effect element Mr3 is electrically connected to a first terminal of the fourth magnetoresistive effect element Mr4. A second terminal of the fourth magnetoresistive effect element Mr4 is electrically connected to the higher-potential electrical path of the power supply.

A first terminal of the fifth magnetoresistive effect element Mr5 is electrically connected to the higher-potential electrical path of the power supply. A second terminal of the fifth magnetoresistive effect element Mr5 is electrically connected to a first terminal of the sixth magnetoresistive effect element Mr6. A second terminal of the sixth magnetoresistive effect element Mr6 is electrically connected to the lower-potential electrical path of the power supply.

A first terminal of the seventh magnetoresistive effect element Mr7 is electrically connected to the higher-potential electrical path of the power supply. A second terminal of the seventh magnetoresistive effect element Mr7 is electrically connected to a first terminal of the eighth magnetoresistive effect element Mr8. A second terminal of the eighth magnetoresistive effect element Mr8 is electrically connected to the lower-potential electrical path of the power supply.

The fifth magnetoresistive effect element Mr5 and the sixth magnetoresistive effect element Mr6 form a third half-bridge circuit H3. More specifically, the third half-bridge circuit H3 includes the fifth magnetoresistive effect element Mr5, the sixth magnetoresistive effect element Mr6, and the third output terminal H30. The third half-bridge circuit H3 is a constituent element of the magnetic sensor 100. The third half-bridge circuit H3 is held by the holding member 7. The fifth magnetoresistive effect element Mr5 and the sixth magnetoresistive effect element Mr6 are half-bridge connected to each other. The third output terminal H30 delivers a third output signal, having a reverse phase with respect to the first output signal, from a node of connection between the fifth magnetoresistive effect element Mr5 and the sixth magnetoresistive effect element Mr6.

The seventh magnetoresistive effect element Mr7 and the eighth magnetoresistive effect element Mr8 form a fourth half-bridge circuit H4. More specifically, the fourth half-bridge circuit H4 includes the seventh magnetoresistive effect element Mr7, the eighth magnetoresistive effect element Mr8, and the fourth output terminal H40. The fourth half-bridge circuit H4 is a constituent element of the magnetic sensor 100. The fourth half-bridge circuit H4 is held by the holding member 7. The seventh magnetoresistive effect element Mr7 and the eighth magnetoresistive effect element Mr8 are half-bridge connected to each other. The fourth output terminal H40 delivers a fourth output signal, having a reverse phase with respect to the second output signal, from a node of connection between the seventh magnetoresistive effect element Mr7 and the eighth magnetoresistive effect element Mr8.

Comparing the first half-bridge circuit H1 and the third half-bridge circuit H3 with each other, it can be seen that each of the two half-bridge circuits H1, H3 includes two magnetoresistive effect elements Mr0 with the same combination of sensitivity directions but that the arrangement of the magnetoresistive effect elements Mr0 on the higher- and lower-potential sides in one of these two half-bridge circuits H1, H3 is opposite from the arrangement in the other half-bridge circuit H3, H1 as shown in FIG. 1. Thus, the third output signal has a reverse phase with respect to the first output signal.

Comparing the second half-bridge circuit H2 and the fourth half-bridge circuit H4 with each other, it can be seen that each of the two half-bridge circuits H2, H4 includes two magnetoresistive effect elements Mr0 with the same combination of sensitivity directions but that the arrangement of the magnetoresistive effect elements Mr0 on the higher- and lower-potential sides in one of these two half-bridge circuits H2, H4 is opposite from the arrangement in the other half-bridge circuit H4, 112 as shown in FIG. 2. Thus, the fourth output signal has a reverse phase with respect to the second output signal.

The first output terminal H10, the second output terminal H20, the third output terminal H30, and the fourth output terminal H40 are all electrically connected to the processing circuit 201. The first output terminal H10 is electrically connected to a node of connection between the first magnetoresistive effect element Mr1 and the fifth magnetoresistive effect element Mr5. The second output terminal H20 is electrically connected to a node of connection between the second magnetoresistive effect element Mr2 and the sixth magnetoresistive effect element Mr6. The third output terminal H30 is electrically connected to a node of connection between the third magnetoresistive effect element Mr3 and the seventh magnetoresistive effect element Mr7. The fourth output terminal 1140 is electrically connected to a node of connection between the fourth magnetoresistive effect element Mr4 and the eighth magnetoresistive effect element Mr8.

The magnetoresistive effect element Mr0 is a giant magnetoresistance (GMR) element. More specifically, the magnetoresistive effect element Mr0 is a current-in-plane (CIP) type GMR element. As shown in FIG. 6, the magnetoresistive effect element Mr0 includes a multilayer stack 90 and an undercoat layer 93.

The multilayer stack 90 is formed by alternately stacking, one on top of another, a plurality of magnetic layers 91, each containing NiFeCo as a component, and a plurality of non-magnetic layers 92, each containing Cu as a component. Such a structure enables providing a high-output magnetoresistive effect element Mr0. The number of layers of the multilayer stack 90 may be, for example, either equal to or greater than 10 or equal to or greater than 20. The magnetic layer 91 is a layer of a ferromagnetic material. The magnetic layer 91 is magnetized more easily than the non-magnetic layer 92. The non-magnetic layer 92 preferably contains Cu only.

The non-magnetic layer 92 preferably has a thickness corresponding to a first peak of RKKY oscillations of a magnetoresistance change rate that depends on the thickness of Cu. Specifically, the non-magnetic layer 92 preferably has a thickness of about 1 nm. This configuration may increase the linearity of an output waveform of the magnetoresistive effect element Mr0 with respect to the magnitude of the applied magnetic field, and therefore, may increase the output of the magnetoresistive effect element Mr0. Consequently, the orientation of the magnetic field applied to the magnetic sensor 100 may be detected more accurately. It can be said that as long as the non-magnetic layer 92 has a thickness falling within the range from 0.9 nm to 1.1 nm, the thickness of the non-magnetic layer 92 corresponds to the first peak.

Figure 6:
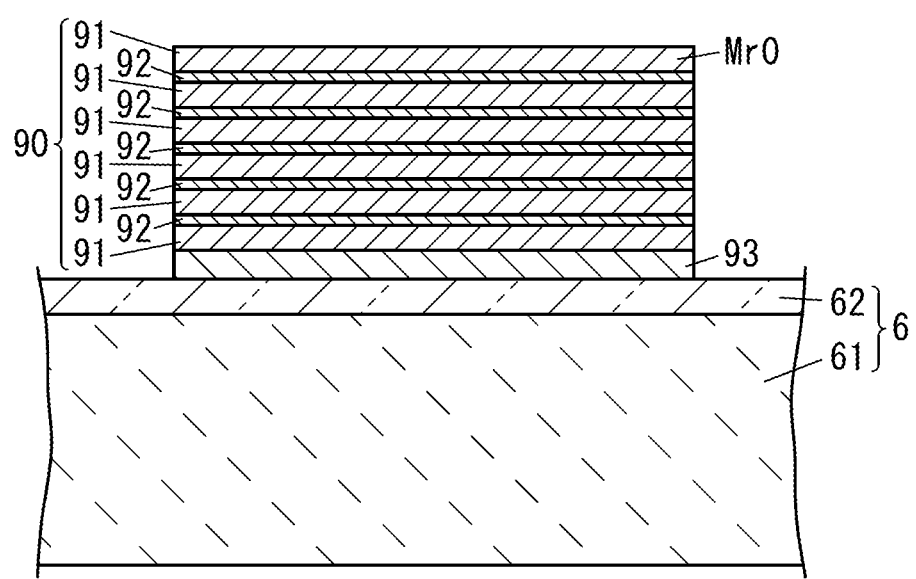
FIG. 6 is a cross-sectional view of a magnetoresistive effect element of the magnetic sensor.

The sensor block Sb1 further includes a substrate layer 6 (refer to FIG. 6). The substrate layer 6 includes a substrate 61 (refer to FIG. 6) and a glazing layer 62 (refer to FIG. 6).

The substrate 61 is a rigid substrate. The substrate 61 may be an alumina substrate, for example. The glazing layer 62 is formed on the surface of the substrate 61. The glazing layer 62 includes, as a material, a glass material such as amorphous glass. The glazing layer 62 is formed by printing glass paste onto the surface of the substrate 61 and firing the glass paste. On the surface of the glazing layer 62, the magnetoresistive effect element Mr0 is formed.

The multilayer stack 90 is laid on top of the undercoat layer 93. More specifically, the undercoat layer 93 is formed on the surface of the glazing layer 62 of the substrate layer 6 and the multilayer stack 90 is formed on the surface of the undercoat layer 93. The undercoat layer 93 contains NiFeCr as a component thereof. Providing the undercoat layer 93 enables providing a high-output magnetoresistive effect element Mr0. In addition, providing the undercoat layer 93 allows crystal grains in the magnetic layer 91 to grow sufficiently, thus significantly improving the heat resistance of the magnetoresistive effect element Mr0.

The magnetoresistive effect element Mr0 has no sensitivity in a predetermined direction but has sensitivity isotropically in a plurality of directions intersecting with the predetermined direction.

The anisotropic magnetic field of the magnetoresistive effect element Mr0 is greater in field strength than the magnetic field applied from the rotor 8 (refer to FIG. 3), which generates a magnetic field to be detected, to the magnetic sensor 100. That is to say, the anisotropic magnetic field of the magnetoresistive effect element Mr0 is greater in field strength than the magnetic field to be detected by the magnetic sensor 100. This enables reducing the distortion of the output waveform of the magnetoresistive effect element Mr0.

(6) Processing Circuit

The processing circuit 201 (refer to FIG. 5) includes a computer system including one or more processors and a memory. The functions of the processing circuit 201 are performed by making the processor of the computer system execute a program stored in the memory of the computer system. The program may be stored in the memory. Alternatively, the program may also be downloaded via a telecommunications line such as the Internet or distributed after having been stored in a non-transitory storage medium such as a memory card.

The processing circuit 201 determines, based on the first, second, third, and fourth output signals, the orientation of the magnetic field applied to the magnetic sensor 100.

(7) Detection of Magnetic Field Orientation

The magnetic sensor 100 is disposed in the vicinity of the rotor 8. The plurality of magnetic poles 80 of the rotor 8 form a magnetizing field. As the rotor 8 rotates, the orientation of the magnetic field applied to the magnetic sensor 100 changes. The processing circuit 201 determines, based on the output of the magnetic sensor 100, the orientation of the magnetic field applied to the magnetic sensor 100.

Note that supposing that not the rotor 8 but the magnetic sensor 100 rotates with respect to the rotor 8, the orientation of the magnetic field applied to the magnetic sensor 100 also changes as the magnetic sensor 100 rotates, and the processing circuit 201 may also determine the orientation of the magnetic field. Thus, in the following description, a situation where the rotor 8 is fixed and the magnetic sensor 100 changes its position in the order of L1, L11, L2, L21, and L3 will be described with reference to FIG. 3. The magnetic sensor 100 rotates around the rotor 8, and therefore, the X-axis, the Y-axis, the V-axis, and the W-axis also rotate accordingly.

At each of the position L1, L11, L2, L21, and L3, the magnetic sensor 100 is located radially outside of the rotor 8. In this case, the orientation of the magnetic field applied to the magnetic sensor 100 is perpendicular to the direction defined by the rotational axis of the rotor 8. Thus, the orientation of the magnetic sensor 100 needs to be adjusted to make the Z-axis defined for the magnetic sensor 100 aligned with the direction of the rotational axis of the rotor 8.

Figure 7:
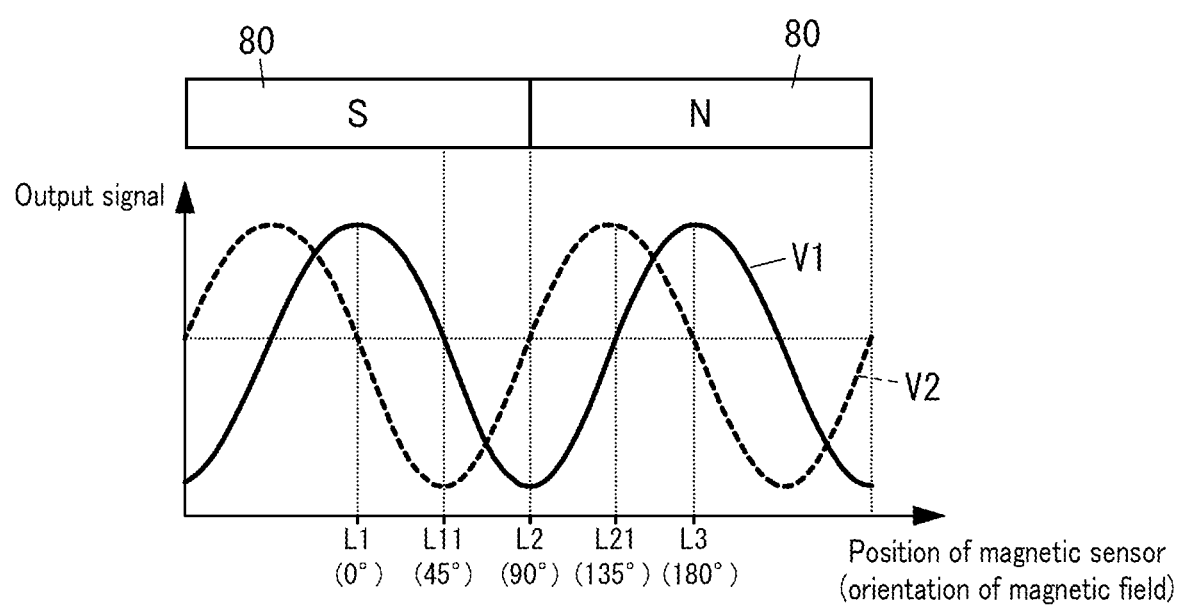
FIG. 7 shows output signals of the magnetic sensor.

As the magnetic sensor 100 changes its position in the order of L1, L11, L2, L21, and L3 (actually, as the rotor 8 rotates), each of the first, second, third, and fourth output signals changes in either a sinusoidal wave or a cosine wave. FIG. 7 shows a waveform V1 of the first output signal and a waveform V2 of the second output signal. The third output signal is a signal having a reverse phase with respect to the first output signal. The fourth output signal is a signal having a reverse phase with respect to the second output signal. Thus, illustration of the third and fourth output signal is omitted from FIG. 7. In FIG. 7, the plurality of magnetic poles 80 is illustrated as straight ones for the sake of convenience.

When the magnetic sensor 100 is located at a position L1 or L3 where the magnetic sensor 100 faces the center of one of the magnetic poles 80 of the rotor 8, a magnetic field aligned with the X-axis is applied to the magnetic sensor 100. In such a situation, the first magnetoresistive effect element Mr1 and the fifth magnetoresistive effect element Mr5 of the first sensor block 1 will have a maximum electrical resistance value. Meanwhile, the second magnetoresistive effect element Mr2 and the sixth magnetoresistive effect element Mr6 of the second sensor block 2 will have a minimum electrical resistance value. Consequently, the first output signal delivered from the first output terminal H10 will be maximum. The electrical resistance values of the respective magnetoresistive effect elements Mr0 of the third sensor block 3 and the fourth sensor block 4 are equal to each other.

When the magnetic sensor 100 is located at a position L2 where the magnetic sensor 100 faces the boundary between an N-magnetic pole 80 and an S-magnetic pole 80 of the rotor 8, a magnetic field aligned with the Y-axis is applied to the magnetic sensor 100. In such a situation, the first magnetoresistive effect element Mr1 and the fifth magnetoresistive effect element Mr5 of the first sensor block 1 will have a minimum electrical resistance value. Meanwhile, the second magnetoresistive effect element Mr2 and the sixth magnetoresistive effect element Mr6 of the second sensor block 2 will have a maximum electrical resistance value. Consequently, the first output signal delivered from the first output terminal H10 will be minimum. The electrical resistance values of the respective magnetoresistive effect elements Mr0 of the third sensor block 3 and the fourth sensor block 4 are equal to each other.

When the magnetic sensor 100 is located at a position L11 that is an intermediate position between the positions L1 and L2, a magnetic field aligned with the W-axis is applied to the magnetic sensor 100. In such a situation, the electrical resistance values of the respective magnetoresistive effect elements Mr0 of the first sensor block 1 and the second sensor block 2 are equal to each other. The third magnetoresistive effect element Mr3 and the seventh magnetoresistive effect element Mr7 of the third sensor block 3 will have a minimum electrical resistance value. The fourth magnetoresistive effect element Mr4 and eighth magnetoresistive effect element Mr8 of the fourth sensor block 4 will have a maximum electrical resistance value. Consequently, the second output signal delivered from the second output terminal H20 will be minimum.

When the magnetic sensor 100 is located at a position L21 that is an intermediate position between the positions L2 and L3, a magnetic field aligned with the V-axis is applied to the magnetic sensor 100. In such a situation, the electrical resistance values of the respective magnetoresistive effect elements Mr0 of the first sensor block 1 and the second sensor block 2 are equal to each other. The third magnetoresistive effect element Mr3 and the seventh magnetoresistive effect element Mr7 of the third sensor block 3 will have a maximum electrical resistance value. Meanwhile, the fourth magnetoresistive effect element Mr4 and eighth magnetoresistive effect element Mr8 of the fourth sensor block 4 will have a minimum electrical resistance value. Consequently, the second output signal delivered from the second output terminal H20 will be maximum.

As shown in FIG. 7, every time a relative rotational angle of the magnetic sensor 100 with respect to the rotor 8 changes by a rotational angle corresponding to the width of each magnetic pole 80, the first and second output signals will repeat the same waveform. In other words, the rotational angle corresponding to the width of each magnetic pole 80 corresponds to one cycle of the second output signal.

Supposing the first and second output signals are each a sinusoidal wave, the phase difference between the first and second output signals is a rotational angle corresponding to one quarter of the width of each magnetic pole 80. That is to say, the phase difference is a quarter of one cycle. Therefore, supposing the first output signal is a sinusoidal wave, the second output signal will be a cosine wave with respect to the first output signal.

For example, the processing circuit 201 derives, based on the first and second output signals, a common phase between the first output signal as a sinusoidal wave and the second output signal as a cosine wave. The processing circuit 201 may decide that every time the phase has changed by one cycle, the magnetic sensor 100 (actually, the rotor 8) have rotated to a rotational angle corresponding to one cycle. In other words, the processing circuit 201 may decide that every time the phase has changed by one cycle, the magnetic sensor 100 (actually, the rotor 8) have rotated to a rotational angle corresponding to the width of each magnetic pole 80. In this manner, the processing circuit 201 may determine how much the magnetic sensor 100 (actually the rotor 8) has rotated from the rotational angle at the starting point. That is to say, the processing circuit 201 may determine a relative rotational angle.

Also, the phases of the first and second output signals correspond to the orientation of the magnetic field applied to the magnetic sensor 100. That is to say, the processing circuit 201 may determine the orientation of the magnetic field applied to the magnetic sensor 100. More specifically, the processing circuit 201 may determine the orientation of the magnetic field applied to the magnetic sensor 100 within a range of 0 degrees to 180 degrees.

In another example, the processing circuit 201 may determine, based on not only the first and second output signals but also the third and fourth output signals, the rotational angle of the magnetic sensor 100 (actually the rotor 8). Specifically, the processing circuit 201 generates a first differential signal representing the difference between the first output signal and the third output signal. The first differential signal has a waveform, of which the amplitude is double the amplitude of the first output signal. In addition, the processing circuit 201 also generates a second differential signal representing the difference between the second output signal and the fourth output signal. The second differential signal has a waveform, of which the amplitude is double the amplitude of the second output signal. The processing circuit 201 derives, based on the first and second differential signals, a common phase between the first differential signal as a sinusoidal wave and the second differential signal as a cosine wave. The processing circuit 201 may decide that every time the phase has changed by one cycle, the magnetic sensor 100 (actually, the rotor 8) have rotated to a rotational angle corresponding to one cycle. The amplitude of the first and second differential signals is double the amplitude of the first and second output signals, thus allowing the orientation of the magnetic field and the rotational angle of the magnetic sensor 100 (actually the rotor 8) to be determined more accurately.

Optionally, the magnetic detection system 200 may include a sensor (such as an optical sensor or a magnetic sensor) for detecting the starting point of movement (e.g., rotation) of the target of measurement (e.g., the rotor 8 in this case). Every time the target of measurement makes one full rotation, the sensor generates a predetermined output signal and the processing circuit 201 detects the starting point based on the predetermined output signal.

(First Variation)

A first variation of the exemplary embodiment will be described below. In the following description, any constituent element of this first variation, having the same function as a counterpart of the embodiment described above, will be designated by the same reference numeral as that counterpart's, and description thereof will be omitted herein.

In the exemplary embodiment described above with reference to FIG. 3, the magnetic sensor 100 is disposed outside of the circumference of the rotor 8. However, this is only an example and should not be construed as limiting. Alternatively, the magnetic sensor 100 may also be disposed at a position L30 (refer to FIG. 3), for example. That is to say, the magnetic sensor 100 may also be disposed at a position where the magnetic sensor 100 faces the rotor 8 in a direction parallel to the rotational axis of the rotor 8. Even in that case, as the rotor 8 rotates, the magnetic field applied to the magnetic sensor 100 also rotates to allow the magnetic sensor 100 to detect the orientation of the magnetic field.

In that case, however, the orientation of the magnetic sensor 100 needs to be different from that of the exemplary embodiment described above. The orientation of the magnetic field applied to the magnetic sensor 100 will be perpendicular to the radial direction of the rotor 8. Thus, the orientation of the magnetic sensor 100 needs to be adjusted such that the Z-axis defined for the magnetic sensor 100 is aligned with the radial direction of the rotor 8.

(Other Variations of Exemplary Embodiment)

Next, other variations of the exemplary embodiment will be enumerated one after another. Note that the variations to be described below may be adopted in combination as appropriate. Optionally, the variations to be described below may also be adopted as appropriate in combination with the first variation described above.

The magnetic sensor 100 does not have to be used to detect the rotational angle of the target of detection. Alternatively, the magnetic sensor 100 may also be used to detect a linear movement of a target of detection.

The target of detection does not have to be the rotor 8. Optionally, the target of detection and an object that generates magnetism to be detected by the magnetic sensor 100 may be formed separately from each other and then attached to each other.

The magnetic sensor 100 does not have to be used to determine the rotational angle but only needs to be used to detect the orientation of the magnetic field.

The holding member 7 does not have to have the structure in which the sensor blocks Sb1 are inserted into, and held by, the depressions 71 as described for the exemplary embodiment. Alternatively, the holding member 7 may also have a structure for holding the sensor blocks Sb1 by, for example, bonding with an adhesive, screwing, fitting a projection into a recess, clamping, soldering, or brazing.

The respective orientations of the plurality of sensor blocks Sb1 areas already described for the exemplary embodiment. Nevertheless, the arrangement of the plurality of sensor blocks Sb1 may be changed arbitrarily. For example, when viewed in the Z-axis direction, either the third sensor block 3 or the fourth sensor block 4 may be adjacent to the first sensor block 1. In addition, two or more sensor blocks Sb1 out of the plurality of sensor blocks Sb1 may also have mutually different Z coordinates, for example.

The V-axis does not have to be an axis aligned with a 45-degree direction with respect to the X-axis. Alternatively, the V-axis may also be an axis aligned with a 30, 35, 40, 50, or 55 degree direction with respect to the X-axis. Even in that case, a phase difference is also caused between the first and second output signals, and therefore, the orientation of the magnetic field may also be determined based on the first and second output signals.

Optionally, the third half-bridge circuit H3 and the fourth half-bridge circuit H4 may be omitted from the magnetic sensor 100. In that case, the processing circuit 201 may determine the orientation of the magnetic field applied to the magnetic sensor 100 based on the first and second output signals, instead of the first differential signal representing the difference between the first and third output signals and the second differential signal representing the difference between the second and fourth output signals.

(Recapitulation)

The exemplary embodiment and its variations described above are specific implementations of the following aspects of the present disclosure.

A magnetic sensor (100) according to a first aspect includes a first half-bridge circuit (H1), a second half-bridge circuit (H2), and a holding member (7). The first half-bridge circuit (H1) includes: a first magnetoresistive effect element (Mr1) and a second magnetoresistive effect element (Mr2) that are half-bridge connected to each other, and a first output terminal (H10) that delivers a first output signal from a node of connection between the first magnetoresistive effect element (Mr1) and the second magnetoresistive effect element (Mr2). The second half-bridge circuit (H2) includes: a third magnetoresistive effect element (Mr3) and a fourth magnetoresistive effect element (Mr4) that are half-bridge connected to each other; and a second output terminal (H20) that delivers a second output signal from a node of connection between the third magnetoresistive effect element (Mr3) and the fourth magnetoresistive effect element (Mr4). The holding member (7) holds the first half-bridge circuit (H1) and the second half-bridge circuit (H2). The first magnetoresistive effect element (Mr1) detects a magnetic field aligned with an X-axis. The second magnetoresistive effect element (Mr2) detects a magnetic field aligned with a Y-axis perpendicular to the X-axis. The third magnetoresistive effect element (Mr3) detects a magnetic field aligned with a first axis coplanar with the X-axis and the Y-axis and different from any one of the X-axis or the Y-axis. The fourth magnetoresistive effect element (Mr4) detects a magnetic field aligned with a second axis coplanar with the X-axis and the Y-axis and perpendicular to the first axis.

This configuration causes a first output signal delivered as a magnetic field applied to the magnetic sensor (100) rotates to have a waveform close to an ideal sinusoidal wave and causes a second output signal to have a waveform having a phase shift with respect to the sinusoidal wave. This enables accurately determining, based on the first output signal and the second output signal, the orientation of the magnetic field applied to the magnetic sensor (100).

In a magnetic sensor (100) according to a second aspect, which may be implemented in conjunction with the first aspect, each of the first, second, third, and fourth magnetoresistive effect elements (Mr1-Mr4) includes a multilayer stack (90) in which at least one magnetic layer (91) containing NiFeCo as a component and at least one non-magnetic layer (92) containing Cu as a component are alternately stacked.

This configuration contributes to increasing the output of the magnetoresistive effect elements (Mr0).

In a magnetic sensor (100) according to a third aspect, which may be implemented in conjunction with the second aspect, each of the first, second, third, and fourth magnetoresistive effect elements (Mr1-Mr4) includes: an undercoat layer (93) containing NiFeCr as a component; and the multilayer stack (90) laid on top of the undercoat layer (93).

This configuration contributes to increasing the output of the magnetoresistive effect elements (Mr0).

In a magnetic sensor (100) according to a fourth aspect, which may be implemented in conjunction with the second or third aspect, the non-magnetic layer (92) has a thickness corresponding to a first peak of RKKY oscillations of a magnetoresistance change rate that depends on a thickness of Cu.

This configuration allows the magnetoresistive effect element to have an output waveform with good linearity with respect to the applied magnetic field, thus enabling more accurately determining the orientation of the magnetic field applied to the magnetic sensor (100).

In a magnetic sensor (100) according to a fifth aspect, which may be implemented in conjunction with any one of the first to fourth aspects, the first axis is an axis aligned with a 45-degree direction with respect to the X-axis.

This configuration causes the first output signal delivered as the magnetic field applied to the magnetic sensor (100) rotates to have a waveform close to an ideal sinusoidal wave and causes the second output signal to have a waveform close to an ideal cosine wave. This makes it easier to determine the orientation of the magnetic field applied to the magnetic sensor (100).

In a magnetic sensor (100) according to a sixth aspect, which may be implemented in conjunction with any one of the first to fifth aspects, with respect to each of the first, second, third, and fourth magnetoresistive effect elements (Mr1-Mr4), an anisotropic magnetic field has a greater field strength than a magnetic field to be detected.

This configuration may reduce the distortion of the waveforms of the first output signal and the second output signal.

A magnetic sensor (100) according to a seventh aspect, which may be implemented in conjunction with any one of the first to sixth aspects, further includes a third half-bridge circuit (H3) and a fourth half-bridge circuit (H4). The third half-bridge circuit (H3) includes: a fifth magnetoresistive effect element (Mr8) and a sixth magnetoresistive effect element (Mr6) that are half-bridge connected to each other; and a third output terminal (H30) that delivers a third output signal from a node of connection between the fifth magnetoresistive effect element (Mr5) and the sixth magnetoresistive effect element (Mr6). The third output signal has a reverse phase with respect to the first output signal. The third half-bridge circuit (H3) is held by the holding member (7). The fourth half-bridge circuit (H4) includes: a seventh magnetoresistive effect element (Mr7) and an eighth magnetoresistive effect element (Mr8) that are half-bridge connected to each other; and a fourth output terminal (H40) that delivers a fourth output signal from a node of connection between the seventh magnetoresistive effect element (Mr7) and the eighth magnetoresistive effect element (Mr8). The fourth output signal has a reverse phase with respect to the second output signal. The fourth half-bridge circuit (H4) is held by the holding member (7).

This configuration allows the output to be approximately doubled by deriving a differential output between two signals having mutually opposite phases, thus enabling more accurately determining the orientation of the magnetic field applied to the magnetic sensor (100).

A magnetic sensor (100) according to an eighth aspect, which may be implemented in conjunction with the seventh aspect, further includes a body (Sb10). The body (Sb10) holds the first magnetoresistive effect element (Mr1) and the fifth magnetoresistive effect element (Mr5). The holding member (7) holds the body (Sb10).

This configuration allows the first magnetoresistive effect element (Mr1) and the fifth magnetoresistive effect element (Mr5) to maintain their positional relation.

A magnetic sensor (100) according to a ninth aspect, which may be implemented in conjunction with any one of the first to eighth aspects, further includes a flexible board (5). On the flexible board (5), the first, second, third, and fourth magnetoresistive effect elements (Mr1-Mr4) are mounted. The holding member (7) holds the first, second, third, and fourth magnetoresistive effect elements (Mr1-Mr4) along with the flexible board (5).

This configuration allows the plurality of magnetoresistive effect elements (Mr0) to be held collectively by the holding member (7).

Note that the constituent elements according to the second to ninth aspects are not essential constituent elements for the magnetic sensor (100) but may be omitted as appropriate.

A magnetic detection system (200) according to a tenth aspect includes the magnetic sensor (100) according to any one of the first to ninth aspects and a processing circuit (201). The processing circuit (201) determines, based on at least the first output signal and the second output signal, an orientation of a magnetic field applied to the magnetic sensor (100).

This configuration may provide a magnetic detection system (200) including a processing circuit (201) as an integral part thereof.

REFERENCE SIGNS LIST

5 Flexible Board
7 Holding Member
90 Multilayer Stack
91 Magnetic Layer
92 Non-Magnetic Layer
93 Undercoat Layer
100 Magnetic Sensor
200 Magnetic Detection System
201 Processing Circuit
H1 First Half-Bridge Circuit
H2 Second Half-Bridge Circuit
H3 Third Half-Bridge Circuit
H4 Fourth Half-Bridge Circuit
H10 First Output Terminal
H20 Second Output Terminal
H30 Third Output Terminal
H40 Fourth Output Terminal
Mr1 First Magnetoresistive Effect Element
Mr2 Second Magnetoresistive Effect Element
Mr3 Third Magnetoresistive Effect Element
Mr4 Fourth Magnetoresistive Effect Element
Mr5 Fifth Magnetoresistive Effect Element
Mr6 Sixth Magnetoresistive Effect Element
Mr7 Seventh Magnetoresistive Effect Element
Mr8 Eighth Magnetoresistive Effect Element
Sb10 Body

The invention claimed is:

1. A magnetic sensor comprising:
a first half-bridge circuit including a first magnetoresistive effect element and a second magnetoresistive effect element that are half-bridge connected to each other and a first output terminal configured to deliver a first output signal from a node of connection between the first magnetoresistive effect element and the second magnetoresistive effect element;
a second half-bridge circuit including a third magnetoresistive effect element and a fourth magnetoresistive effect element that are half-bridge connected to each other and a second output terminal configured to deliver a second output signal from a node of connection between the third magnetoresistive effect element and the fourth magnetoresistive effect element; and
a holding member that holds the first half-bridge circuit and the second half-bridge circuit,
the first magnetoresistive effect element being configured to detect a magnetic field aligned with an X-axis,
the second magnetoresistive effect element being configured to detect a magnetic field aligned with a Y-axis perpendicular to the X-axis,
the third magnetoresistive effect element being configured to detect a magnetic field aligned with a first axis, the first axis being coplanar with the X-axis and the Y-axis and different from any one of the X-axis or the Y-axis,
the fourth magnetoresistive effect element being configured to detect a magnetic field aligned with a second axis, the second axis being coplanar with the X-axis and the Y-axis and perpendicular to the first axis,
each of the first, second, third, and fourth magnetoresistive effect elements including a multilayer stack in which at least one magnetic layer containing NiFeCo as a component and at least one non-magnetic layer containing Cu as a component are alternately stacked,
the non-magnetic layer having a thickness corresponding to a first peak of Ruderman-Kittel-Kasuya-Yoshida (RKKY) oscillations of a magnetoresistance change rate that depends on a thickness of Cu.

2. The magnetic sensor of claim 1, wherein
each of the first, second, third, and fourth magnetoresistive effect elements includes: an undercoat layer containing NiFeCr as a component; and the multilayer stack laid on top of the undercoat layer.

3. The magnetic sensor of claim 1, wherein
the first axis is an axis aligned with a 45-degree direction with respect to the X-axis.

4. The magnetic sensor of claim 1, wherein
with respect to each of the first, second, third, and fourth magnetoresistive effect elements, an anisotropic magnetic field has a greater field strength than a magnetic field to be detected.

5. The magnetic sensor of claim 1, further comprising:
a third half-bridge circuit including a fifth magnetoresistive effect element and a sixth magnetoresistive effect element that are half-bridge connected to each other and a third output terminal configured to deliver a third output signal from a node of connection between the fifth magnetoresistive effect element and the sixth magnetoresistive effect element, the third output signal having a reverse phase with respect to the first output signal, the third half-bridge circuit being held by the holding member; and
a fourth half-bridge circuit including a seventh magnetoresistive effect element and an eighth magnetoresistive effect element that are half-bridge connected to each other and a fourth output terminal configured to deliver a fourth output signal from a node of connection between the seventh magnetoresistive effect element and the eighth magnetoresistive effect element, the fourth output signal having a reverse phase with respect to the second output signal, the fourth half-bridge circuit being held by the holding member.

6. The magnetic sensor of claim 5, further comprising a body that holds the first magnetoresistive effect element and the fifth magnetoresistive effect element, wherein
the holding member holds the body.

7. The magnetic sensor of claim 1, further comprising a flexible board on which the first, second, third, and fourth magnetoresistive effect elements are mounted, wherein
the holding member holds the first, second, third, and fourth magnetoresistive effect elements along with the flexible board.

8. A magnetic detection system comprising:
the magnetic sensor of claim 1; and
a processing circuit configured to determine, based on at least the first output signal and the second output signal, an orientation of a magnetic field applied to the magnetic sensor.

* * * * *